United States Patent
Haimoff et al.

(10) Patent No.: US 8,246,895 B2
(45) Date of Patent: Aug. 21, 2012

(54) INJECTION MOLDING METHOD

(75) Inventors: Efraim Haimoff, Mevasereth Zion (IL); Menahem Tzor, Carmiel (IL); Marcel de Jong, Hulst (NL); Nikolai Duvigneau, Zichron Yaacov (IL)

(73) Assignee: Keter Plastic Ltd., Herzelyia (IL)

( * ) Notice: Subject to any disclaimer, the term of this patent is extended or adjusted under 35 U.S.C. 154(b) by 145 days.

(21) Appl. No.: 12/516,245

(22) PCT Filed: Nov. 30, 2006

(86) PCT No.: PCT/IL2006/001388
§ 371 (c)(1),
(2), (4) Date: Jul. 13, 2009

(87) PCT Pub. No.: WO2008/062396
PCT Pub. Date: May 29, 2008

(65) Prior Publication Data
US 2010/0044923 A1 Feb. 25, 2010

(30) Foreign Application Priority Data
Nov. 26, 2006 (IL) .......................... 179588

(51) Int. Cl.
*B29C 45/14* (2006.01)
*B29C 45/16* (2006.01)
(52) U.S. Cl. ................. 264/478; 264/484; 264/269
(58) Field of Classification Search .......... 264/478, 264/484, 269
See application file for complete search history.

(56) References Cited

U.S. PATENT DOCUMENTS

| | | | | |
|---|---|---|---|---|
| 3,556,514 A | * | 1/1971 | Stockmann | 264/484 |
| 3,559,248 A | * | 2/1971 | Stockmann | 425/504 |
| 3,602,496 A | * | 8/1971 | Langenohl et al. | 271/14 |
| 4,052,497 A | | 10/1977 | Monnet | |
| 4,686,076 A | | 8/1987 | Dromigny et al. | |
| 4,987,332 A | * | 1/1991 | Yamamoto et al. | 310/309 |
| 5,240,751 A | | 8/1993 | Cakmakci | |
| 5,415,536 A | | 5/1995 | Ohno | |
| 6,090,336 A | | 7/2000 | Hirmer et al. | |
| 6,416,706 B1 | * | 7/2002 | Fisher et al. | 264/484 |
| 6,447,706 B1 | | 9/2002 | Savonuzzi | |
| 6,474,976 B1 | | 11/2002 | Oami et al. | |
| 2003/0122278 A1 | | 7/2003 | Kosanvoich | |
| 2005/0140055 A1 | | 6/2005 | Sagol | |

FOREIGN PATENT DOCUMENTS

| | | |
|---|---|---|
| DE | 103 33 158 A1 | 2/2005 |
| EP | 0 510 488 A1 | 10/1992 |
| EP | 0 802 032 A1 | 10/1997 |
| EP | 1 637 457 A1 | 3/2006 |
| JP | A 2004-345300 | 12/2004 |
| WO | WO 03/013843 A1 | 2/2003 |
| WO | WO 2006/076129 A1 | 7/2006 |

* cited by examiner

*Primary Examiner* — Jill Heitbrink
(74) *Attorney, Agent, or Firm* — Oliff & Berridge, PLC (57) ABSTRACT

Molding methods and systems are disclosed for manufacturing molded items (10) with an integral substrate (50) formed thereon, particularly wherein the substrate has a metallic appearance and/or wherein the molded product is formed with a geometric feature (66) associated with an edge of the substrate adapted for at least partially obscuring the edge in the molded product.

17 Claims, 8 Drawing Sheets

INJECTION MOLDING METHOD

FIELD OF THE INVENTION

This invention relates to methods and apparatuses/systems for making a product. More particularly, the present invention relates to methods and apparatuses/systems for making a product by injection molding and to molded products made thereby.

BACKGROUND OF THE INVENTION

Injection molding processes are well known, and generally involve injecting a flowable material such as a plastic into a cavity prepared in a mold, and allowing the material to cool and harden to form a product that has a form generally complementary to that of the mold cavity.

In a variation of such processes, a film may be integrally formed on the product by inserting the film or substrate into the mold prior to the injection of the molten material.

US2005/140055 discloses a method for making a part by injection molding and decorating a visually-exposed face surface and a visually-exposed side surface of the part in their entireties during the injection molding of the part. The method includes the steps of providing a mold, inserting a decorative film into the mold, closing the mold, injecting a molten material into the mold causing the decorative film to conform to the mold by virtue of the molten material, when filling the mold, exerting a force on the decorative film forcing the decorative film to abut intimately against the mold, hardening the molten material so as to form a hardened core, and forming the part with the decorative film being adhered to the hardened core, by virtue of the decorative film being possessed by the hardened core when the molten material hardens and becomes the hardened core, so as to allow the decorative film to cover the hardened core and thereby eliminate a concern for color inconsistency of the hardened core caused by color variations of the molten material by virtue of the hardened core being covered by the decorative film.

U.S. 2003/0122278 discloses a method for applying multiple decorative sheets of film to an injection-mold component as a part of the injection mold process. Two sheets of film having desired images are permanently affixed to the surfaces of the injection mold component as a part of the injection molding process. An enhanced three-dimensional appearance is achieved by affixing the images to a transparent injection mold component.

U.S. Pat. No. 4,052,497 discloses a method for the manufacture by injection molding of articles composed of a plurality of layers of at least three distinct materials coated one over the other. The method includes the steps of successive injection of a measured quantity of a first material adapted to form the skin of the article, a measured quantity of a second material to form the intermediate layer, and a measured quantity of a third material to form the body of the article. The materials are introduced into the mold coaxially so as to give a uniform distribution. The method is especially applicable to the production of articles in which the external and internal materials are joined together by an intermediate material.

U.S. Pat. No. 4,686,076 discloses a method, machine, and mold for fabricating, by injection of synthetic material, containers having a film forming an external coating. The machine includes a mold, an injection nozzle, a film feed device, and apparatus for holding the film against the male element of the mold. The injection nozzle is carried by the male element of the mold and the holding apparatus includes a slider in the cavity of the female element movable, under the action of the male element, against a return force.

U.S. Pat. No. 5,240,751 discloses a decorative automotive vehicle trim strip and method and apparatus for forming by reshaping an end of a previously extruded length of thermoplastic material. The surface of the length of the thermoplastic material intended for viewing is maintained at a cold temperature, well below the softening point of the thermoplastic material, during the reshaping operation. The length of the thermoplastic material is heated during reshaping by a mold section heated to 400 degrees F. to 410 degrees F. pressed against the surface intended to be affixed to the vehicle.

U.S. Pat. No. 5,415,536 discloses a method for forming a pattern onto an article during injection molding thereof. A pattern-bearing film is heated and softened by a heating board. The softened pattern-bearing film is transferred to the cavity surface of a female mold. Thereafter, the female mold and a male mold are closed. Then, a molten resin is injected into the cavity. When the pattern-bearing film is brought into contact with and heated by the heating board, marks or impressions of air blow holes on the surface of the heating board remain on the pattern-bearing film. To prevent the formation of these marks or impressions, a square-shaped holding frame is fixed on the surface of the heating board. The peripheral portion of the pattern-bearing film is held on the surface of the holding frame. Thus, while the pattern portion of the pattern-bearing film is spaced apart from the surface of the heating board, the film is heated. To keep the pattern-bearing film uniformly spaced from the surface of the heating board, air is supplied to the inside of the holding frame.

U.S. Pat. No. 6,090,336 discloses a method and apparatus for manufacturing an injection-molded article having an outer film on an exposed surface. The method includes securing the film about its periphery within a mold cavity prior to injection of molten material into the cavity. One way of securing the film is by applying vacuum pressure through peripheral holes in a frame surrounding the mold cavity. Molten material is injected into the cavity behind the film, and the film slips from its initial position to be forced against a wall of the cavity by molten material being injected into the cavity. The apparatus includes a frame for a molding apparatus adapted to initially secure the film in place prior to movement of the core block into place and to permit the film to slip from its initial position to be forced against the cavity wall as molten material fills the cavity.

U.S. Pat. No. 6,474,976 discloses a film holding apparatus for an injection mold which is capable of surely holding a protective film on a specific position of a mold surface of the injection mold. The film holding apparatus for holding an inner film on the mold surface of the injection molds consisting of two coupled molds having substantially-vertical coupled surfaces thereof which includes two positioning pins that can hang an upper edge side of the inner film on an upper edge portion of the mold surface of the mold, and upper and lower vacuum opening portions for film adsorption disposed so as to interpose the positioning pins therebetween from the upper and lower sides. The upper vacuum opening portion is formed in a line which extends along an upper edge of the mold surface.

SUMMARY OF THE INVENTION

Herein, "metallic layer" includes a layer, sheet, net, mesh, strips, foil or the like, made from a material or having a coating comprising a metal or metallic material, and/or comprising a material having the appearance of a metal or metallic material, wherein the "metallic layer" includes a material that is electrically conducting, as opposed to a dielectric material including dielectric materials that may have a metallic-like appearance.

By "visually exposed" with respect to a surface of a part is meant a surface of the part that may usually be seen from particular desired viewing directions when the part is in at least one intended position or location, or from the most common viewing direction for the part. For example, if the part is a box or bin cover that is normally closed, the visually exposed surface thereof may be the upper surface of the cover, this being seen from the regular viewing directions, as opposed to the underside of the cover, which may only be seen when the cover is in the open position or from inside the box or bin.

According to a first aspect of the invention, a manufacturing method is provided, comprising:

providing a substrate, comprising at least one electrically conducting layer overlaid with at least one dielectric outer-facing layer, and further comprising an inner-facing surface;

applying an electrostatic charge to said outer-facing layer;

electrostatically holding said substrate in a desired position within a mold cavity;

injecting a suitable molten material into said mold cavity in a manner such that at least a layer of said molten material possesses said substrate via said inner-facing surface.

The visually exposed surface has a metallic appearance.

In particular, a method for manufacturing molded items having at least one visually exposed surface is provided, comprising:

(a) providing a mold having a molding surface generally complementary to said visually exposed surface;

(b) providing a substrate, comprising at least one electrically conducting layer overlaid with at least one dielectric outer-facing layer, and further comprising an inner-facing surface;

(c) applying an electrostatic charge to said outer-facing layer;

(d) electrostatically holding said substrate in a desired position within said mold such that said outer-facing layer is in at least partial abutment with said molding surface;

(e) injecting a suitable molten material into said mold in a manner such that at least a layer of said molten material is formed in overlying relationship with said inner-facing surface; and (f) allowing the molten material to solidify and possess said substrate.

Optionally, the substrate may further comprise a dielectric inner-facing layer defining said inner-facing surface.

The electrically conducting layer may comprise a metallic material, including for example a metallic foil. The electrically conducting layer may comprise at least one opening therethrough or may be substantially continuous. The electrically conducting layer may comprise a metal or an alloy including at least one of: aluminium, silver, oxidized silver, gold, titanium, copper, tin, steel, stainless steel, galvanized steel, nickel, magnesium.

The outer-facing layer may have a thickness of between about 30 micron and about 400 micron; the electrically conducting layer may comprise a thickness of between about 5 micron and about 15 micron, or between about 15 micron and about 30 micron, or greater than about 30 micron.

Optionally, step (c) comprises holding the substrate in a configuration generally corresponding to the form to be adopted by the substrate in step (f), providing a ground reference surface facing said inner-facing surface, and establishing a suitable electric field between an electric charger and said ground reference surface. Optionally, the substrate may be configured in the form of a loop, including, for example, a cylindrical loop, frustroconical loop, etc.

In step (e), the molten material may be injected into the mold causing the substrate to conform to the mold surface by virtue of the molten material, when filling the mold, exerting a force on the substrate forcing the substrate to abut intimately against the mold surface.

Optionally, the mold may be in particular configured for forming a geometric feature in an item molded therein, said feature being associated with an edge of said substrate and adapted for at least partially obscuring said edge. The geometric feature may comprise a recess in the molded item, wherein said substrate edge is located at least partially projecting into said recess. Alternatively, the geometric feature may comprise a raised step formed on a visually exposed surface of said molded item, wherein said substrate edge is located in close proximity to said step.

According to the second aspect of the invention, a method for manufacturing molded items having at least one visually exposed surface is provided, comprising:

providing a mold having a molding surface generally complementary to said visually exposed surface;

providing a substrate, comprising said at least visually exposed surface and an inner-facing surface;

holding said substrate in a desired position within said mold with said visually exposed surface facing said mold surface, and injecting a suitable molten material into said mold in a manner such that at least a layer of said molten material is formed in overlying relationship with said inner-facing surface, and allowing the molten material to solidify and possess said substrate;

wherein said mold is configured for forming a geometric feature in an item molded therein, said feature being associated with an edge of said substrate and adapted for at least partially obscuring said edge.

The geometric feature may comprise a recess in the molded item, wherein said substrate edge is located at least partially projecting into said recess, or alternatively a raised step formed on a visually exposed surface of said molded item, wherein said substrate edge is located in close proximity to said step.

The substrate may comprise at least one electrically conducting layer overlaid with at least one dielectric outer-facing layer, and further comprising an inner-facing surface, wherein said outer-facing surface comprises said visually exposed surface. Optionally, the substrate may further comprise a dielectric inner-facing layer defining said inner-facing surface. Alternatively, the substrate may be a dielectric substrate.

Thus, the substrate may be fully dielectric or may comprise at least one at least one electrically conducting layer.

The invention also relates to molded items manufactured according to the manufacturing process of the invention. The item may comprise, by way of non-limiting example, a cylindrical form, a frustoconical form, a substantially box-like form, and so on. The item may comprise, by way of non-limiting example, any one of bathroom furniture and accessories, home storage boxes, kitchen furniture and accessories, vehicle accessories, and the like. The item may comprise, by way of non-limiting example, any one of bins, toilet brush containers, toilet tissue dispensers; vehicle body trims, wheel hub covers, side mirror housings, and the like.

The present invention also relates to a system for manufacturing molded items having at least one visually exposed surface, comprising:

a mold having a molding surface generally complementary to said visually exposed surface;

a substrate, comprising at least one electrically conducting layer overlaid with at least one dielectric outer-facing layer, and further comprising an inner-facing surface;

an electric charging device adapted for applying an electrostatic charge to said outer layer;

a positioning mechanism for positioning a substrate within the mold such to enable the substrate to be electrostatically held in a desired position within said mold such an outer charged layer thereof may be in at least partial abutment with said molding surface;

an injector arrangement for injecting a suitable molten material into said mold in a manner such that at least a layer of said molten material is formed in overlying relationship with said inner-facing surface.

Optionally, the system further comprises a magazine having a stack of said substrates, and wherein said positioning mechanism is further adapted for taking a single substrate at a time from said stack and transporting the same to the mold.

According to aspects of the invention, molding methods and systems are disclosed for manufacturing molded items with an integral substrate formed thereon, particularly wherein the substrate has a metallic appearance and/or wherein the molded product is formed with a geometric feature associated with an edge of the substrate adapted for at least partially obscuring the edge in the molded product.

According to the invention, a wide variety of articles of manufacture may be provided, having a visually desirable and realistic/authentic metallic finish, and at the same time avoiding undesirable consequences that may sometimes arise when similar articles are manufactured primarily from metals. Examples may include bathroom furniture and accessories including for example bins, toilet brush container, toilet tissue dispenser; kitchen furniture and accessories; vehicle accessories, for example trims, wheel hub covers, side mirror housings etc. Many such articles, when made primarily from a metal, may be susceptible to denting, rusting or other problems, or may be undesirably heavy or costly. The present invention provides such articles made from a plastic material or other material that may be used in an injection-molding process, but including a visually exposed metallic layer embedded therein, providing a desirable metallic finish to such products.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
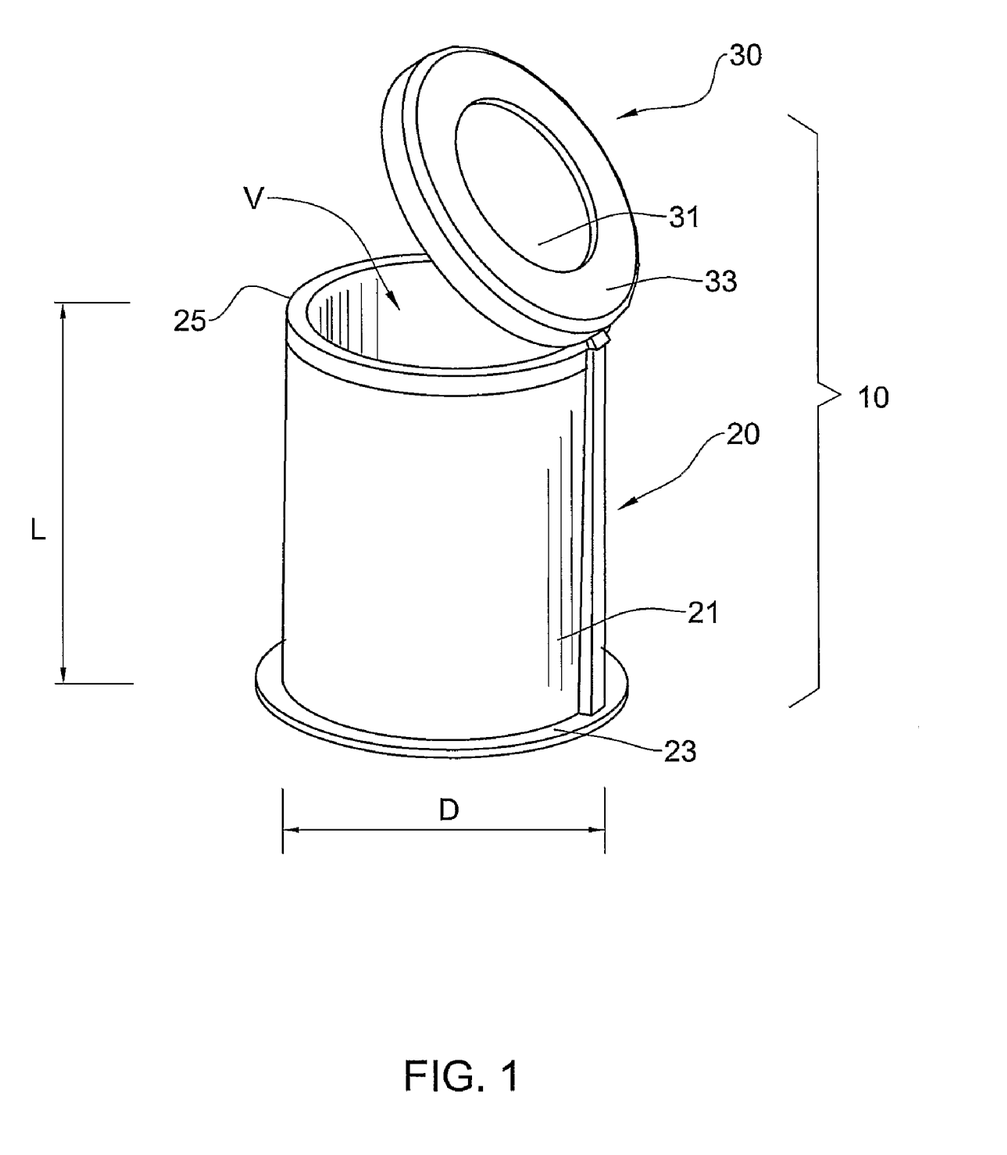
FIG. 1 is an isometric view of an embodiment of an article manufactured according to the invention.

A first embodiment of an item of manufacture produced according to the invention, designated with the numeral 10 and referred to herein interchangeably as an "article", "part" or "product", is illustrated in FIG. 1. The product 10 according to this embodiment may be, by way of non-limiting example, a closable bin, having a lower container part 20 of general cylindrical form having a length dimension L and an outer diameter D defining a fillable volume V, and a lid 30 that is hingedly or otherwise releasably coupled to the lower part 20. The lower part 20 has a visually exposed cylindrical surface 21 of particular interest and an upper rim 25, and is mounted onto a base 23. The lid 30 comprises a visually exposed flat or convex disk-like surface 31 of particular interest and annular rim 33.

According to a first aspect of the present invention, a method and system are provided for manufacturing parts 20 and 30 via a novel injection molding process, wherein said visually exposed surfaces 21 and 31 may have a metallic appearance.

Figure 2A:
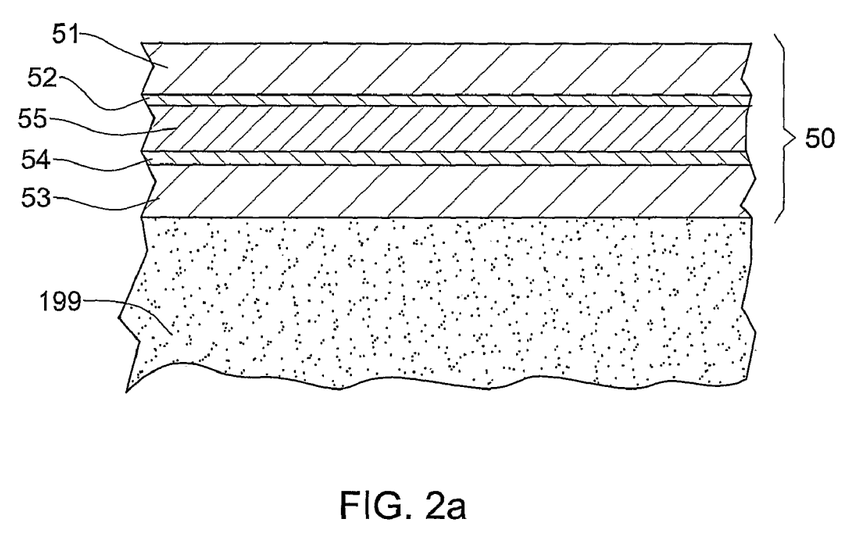
FIG. 2a shows in cross-sectional view a portion of the article of FIG. 1, including details of an embodiment of a substrate according to the invention.

The metallic appearance of visually exposed surfaces 21 and 31 is obtained by individually injection-molding each of the parts 20, 30 in turn, each with a suitable substrate 50 held in place within the corresponding mold, as will be described in greater detail herein. Referring to FIG. 2a, the substrate 50 comprises an electrically conducting metallic layer 55 laminated or otherwise sandwiched between an outer-facing electrically insulating dielectric layer 51 and an inner-facing electrically insulating dielectric layer 53, bonded to the metallic layer 55 by layers or adhesive 52, 54, respectively. Optionally, the outer-facing surface of inner layer 53 and the inner-facing surface of outer layer 51 may be activated by any suitable method, for example a plasma, corona, flame or chemical treatment, to produce a treated layer. Optionally, the outer layer 51 is scratch resistant, while the inner layer 53 is adapted for being possessed by a molten material used in an injection molding process, when in contact therewith.

Thus, the outer layer 51 and the inner layer 53 are individually formed, and then bonded to the metallic layer 55 via adhesives, which optionally may be thermo and/or UV cured, which optionally may be water based or solvent based, and so on. Alternatively, the layers 51, 55, 53 may be bonded mechanically or via ultrasonic welding or in any other suitable manner.

Alternatively, the layers 51, 53 may be otherwise bonded or formed over the metallic layer 55, for example using suitable coating, thermoforming or printing techniques, etc. For example, the layers 51, 53 may be formed over the metallic layer 55 as a lacquer or coating (for example PU, acrylic, cellulose, alkyd, and so on, which may be coated over the metallic layer 55 using any suitable method, for example by evaporation of solvents, self-cross-linking, thermo-curing, UV curing and so on.

Alternatively, the dielectric/metallic layer sandwich construction of the substrate 50 may be achieved by covering the inner-facing part of outer layer 51 and/or the outer facing part of inner layer 53 with metallic layers using a suitable electrochemical; process, for example by means of electrostatic powdering in cold and/or hot state; hard coating in plasma chambers, etc.

Alternatively, the dielectric/metallic layer sandwich construction of the substrate 50 may be achieved by covering the metallic layer 55 with polymers, for example via thermal processes, including, for example, heat transfer coloring processes, heat laminating processes, etc.

The metallic layer 55 may be in the form of a substantially continuous metallic foil, or alternatively may comprise cutouts of any desired design, for example a decorative pattern or company logo, or the layer 55 may be in the form of a net or mesh, and the layers 51, 55, 53 may be bonded together by heat welding or otherwise bonding the inner layer 53 to the outer layer 51 to one another directly via the cutouts.

The outer layer 51 is preferably optically transparent, and optionally shaded in any desired colour, to allow the colour (original or modified via layer 51) and texture of the metallic layer to be readily seen via the outer layer. The inner layer 53 may be transparent, translucent or opaque, and have any desired colour.

Optionally, further intermediate layers, which may be metallic or non metallic, may be provided in the substrate 50 to provide any desired metallic appearance in the surfaces 21 and 31.

By way of non-limiting example, the metallic layer 55 may comprise a foil made of any one of aluminium, silver, oxidized silver, gold, titanium, copper, tin, steel, stainless steel, galvanised steel, nickel, magnesium, or any other suitable metal, which may be in elemental metal or alloy form, for example. Optionally, the metallic layer 55 may be formed from a number of different metals suitably juxtaposed and/or superposed with respect to one another. Further by way of non-limiting example, the metallic layer 55 may be between about 5 micron and about 15 micron thick, or between about 15 micron and about 30 micron thick, or thicker than about 30 micron. The metallic layer 55 may optionally be pre-treated, for example coated with a suitable primer, adhesive, paint, etc, prior to being formed into said substrate 50 and/or prior to being subjected to injection molding according to the invention.

Further by way of non-limiting example, the substrate 50 may be between about 60 micron and about 200 micron thick, or thicker than 200 micron; the inner layer 53 may be made from material that is suitable for use in plastic injection technology, in particular for intimately fusing with injected plastic in contact therewith in a mold, during the molding process, and may include, by way of non-limiting example, any one of bi-oriented polypropylene (BOPP), for example about 20 to about 50 micron thick, or from extrusion direction oriented polypropylene (OPP), for example about 20 to about 150 micron thick, or from cast polypropylene (CCP), for example about 30 to about 200 micron thick; the outer layer 51 may be made from polyethylene-terephthalate (polyester) (PET), for example about 12 micron thick, or up to about 200 micron thick, or greater, or from different other transparent polyesters (for example PETG), or from poly-methyl-met-acrylate (Acrylic) (PMMA), for example about 60 to about 70 micron thick, or up to about 200 micron thick, or up to about 400 micron thick or greater, or from PC or from transparent polyamides, for example PA-11, PA-12, PEBA, or from PS-derivatives, including for example GPPS, SAN, MABS, SBS, K-resins etc. of suitable thickness. The layer 51 may be both rigid and soft (e.g., transparent soft-touch TPE-s, TPV-s, based for example on PU-s, SBS-s, SEBS-s, etc.).

In particular, the outer layer 51 comprises a thickness sufficient to retain a suitable electrostatic charge, for example between about 30 micron to about 200 micron, or greater, for example, for a duration of a few seconds, for example, such as to enable the substrate 50 to be externally charged and placed within a mold cavity, as will be explained in greater detail herein. Such a thickness may range from between about 30 micron to about 100 micron. Examples of suitable substrates 50 are commercially available.

The part 20 and lid 30 may also each comprise other surfaces which are not typically or are not intended to be visually exposed, at least most of the time or from the desired viewing angles of the visually exposed surfaces, and thus may constitute, for example, the inner-facing surfaces of the part 20 and lid 30. Furthermore, there may be some visually exposed surfaces, for example rims 25, 33 of part 20 and lid 30, respectively, which may not necessarily comprise a metallic appearance.

The process for manufacturing part 20 according to one embodiment of the invention will now be described. Referring to FIGS. 3a to 3d, a mold 100 is provided for producing the item 10. The mold 100 comprises a first, female mold part 110 and a second, male mold part 120 which may be reversibly joined together to provide a mold cavity 130 in which the part 20 may be formed. The cavity 130 thus has a size substantially similar to, and a form or shape substantially complementary to, that of the item 20, optionally taking into account factors such as springback, shrinkage and so on, where appropriate, as is known in the art. The first mold part 110 comprises a cavity 132 having a mold surface 122 corresponding to the visually exposed surface 21, which in this particular example is substantially cylindrical. The second mold part 120 comprises a mating portion 125, adapted for mating with mating portion 115 of the first mold part 110 at a parting line. The second mold part 120 also comprises core 128, comprising cylindrical surface 126 and end surface 127, substantially complementary to the unexposed inner surfaces of part 20. When the mold parts 110 and 120 are coupled, the core 128 is received in cavity 132, defining the mold cavity 130.

The mold part 120 further comprises at least one injection station 145, for example at the sides of the surface 126, or at the center of end surface 127 (not shown), providing fluid communication between cavity 130 and an injection material source (not shown), at least when the mold 100 is closed and ready for use.

Optionally, the substrate 50 may be provided as pre-cut films, ready to be used with mold 100. For example, and referring in particular to FIG. 3a, a magazine 160 may be provided holding a stack of superposed substrates 50, as is known in the art. A robotic arm 170, or other suitable positioning mechanism, is provided, configured for transporting, handling and positioning each substrate 50 in turn with respect to the mold 100. The robotic arm 170 comprises an end-of-arm tool 172 in the form of a mandrel or dummy 174, in this particular embodiment being in the form of a drum, having a number of suction ports 173 arranged on the cylindrical surface of the dummy 174, and in fluid communication with a suitable suction source, for example a pump (not shown).

Figure 2B:
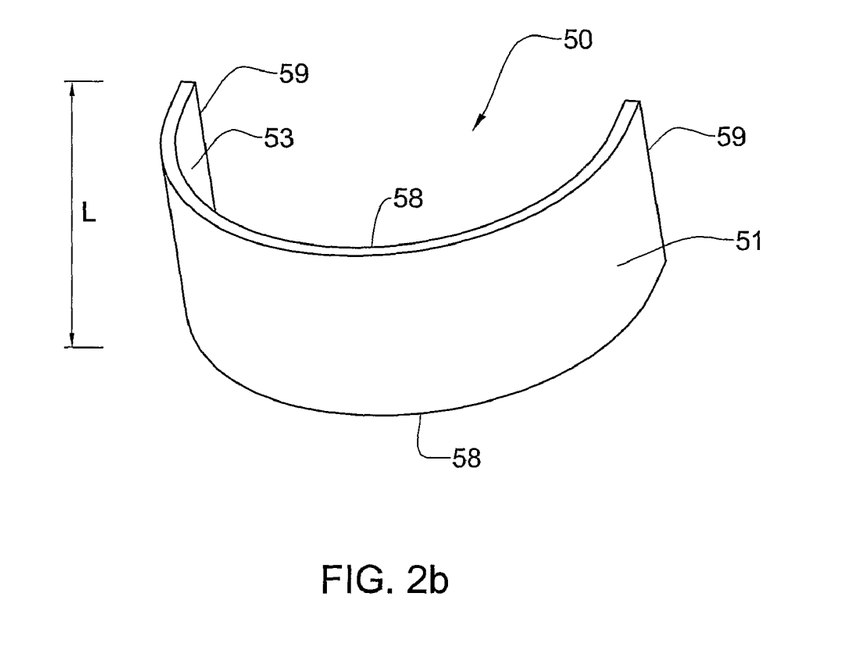
FIG. 2b shows the substrate of FIG. 2a having a generally rectangular planform.

In operation, the dummy 174 may be brought into tangential proximity with an edge 59 of substrate 50, which in this example is of a general rectangular planform having two orthogonally arranged pairs of edges 59, 58 (see FIG. 2b). Edges 59 have a length substantially similar to dimension L of the surface 21, and edges 58 have a length sufficient to enable the substrate to wrap around to form surface 21 of diameter D. An air nozzle arrangement 162 blows a stream of air to separate an uppermost substrate 50 from the stack, and this substrate 50 may then be grasped by a suitable transport mechanism 165, which may comprise, for example, suction pads, and transported towards the dummy 174 until tangential contact is established therewith. A portion of the substrate 50 close to edge 59 is then grasped by the dummy 174 by means of suction ports 173. The dummy 174 may be rotated about its axis 179 thereby winding the substrate 50 onto the cylindrical surface of the dummy 174, and held there via additional suction ports 173, the substrate 50 being disengaged from mechanism 165. Alternatively, the substrate 50 may be lowered onto and draped over the dummy 174 using any suitable mechanism, and the suction ports 173 generate sufficient suction to wind the substrate onto the dummy. The substrate 50 is wound onto the dummy 174 such that the outer-facing layer 51 is outermost, and the inner-facing layer 53 is facing the cylindrical surface of dummy 174.

Figure 3A:
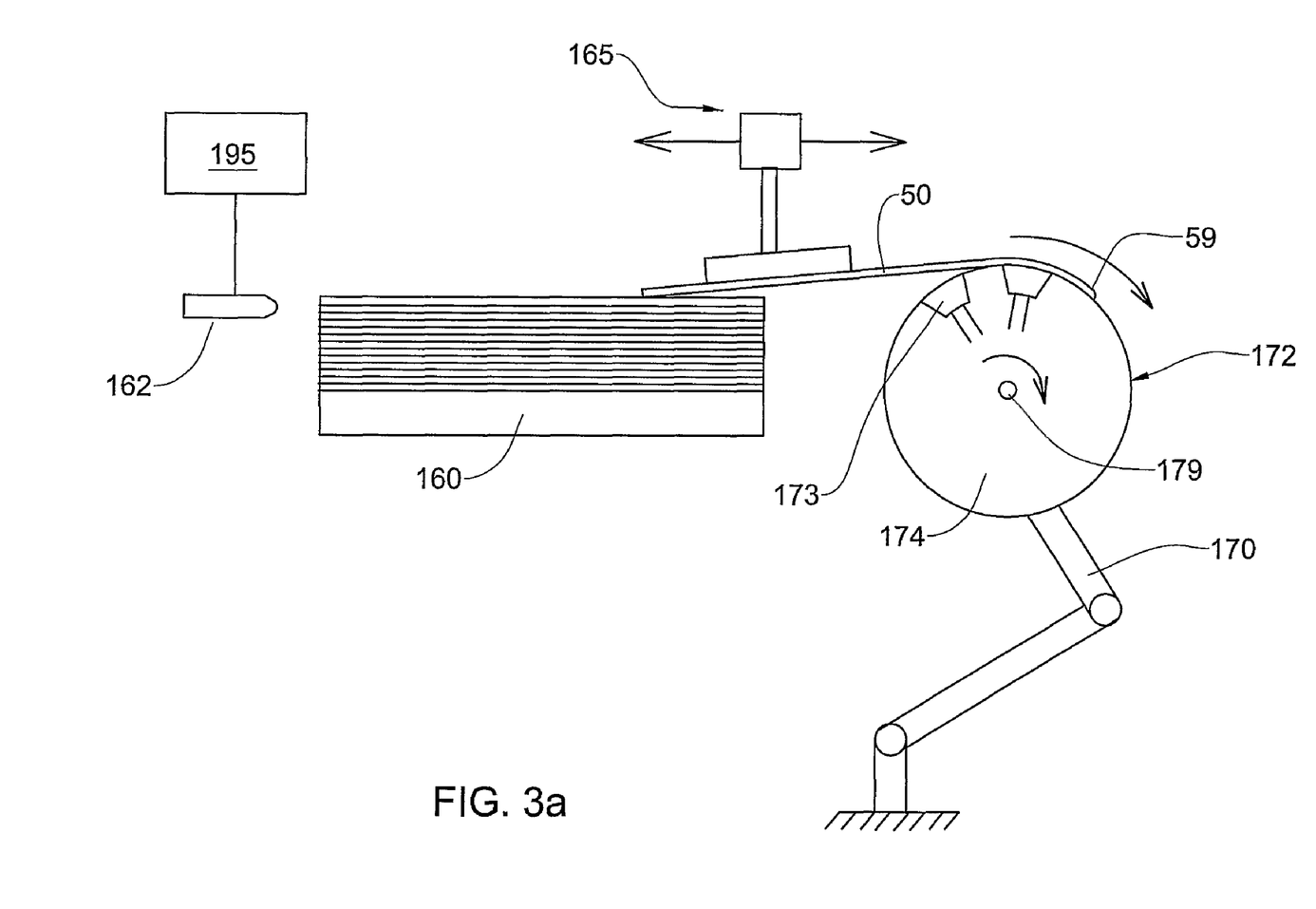
FIGS. 3a to 3d illustrate various steps in the manufacture of a part of the embodiment of FIG. 1
Figure 3B:
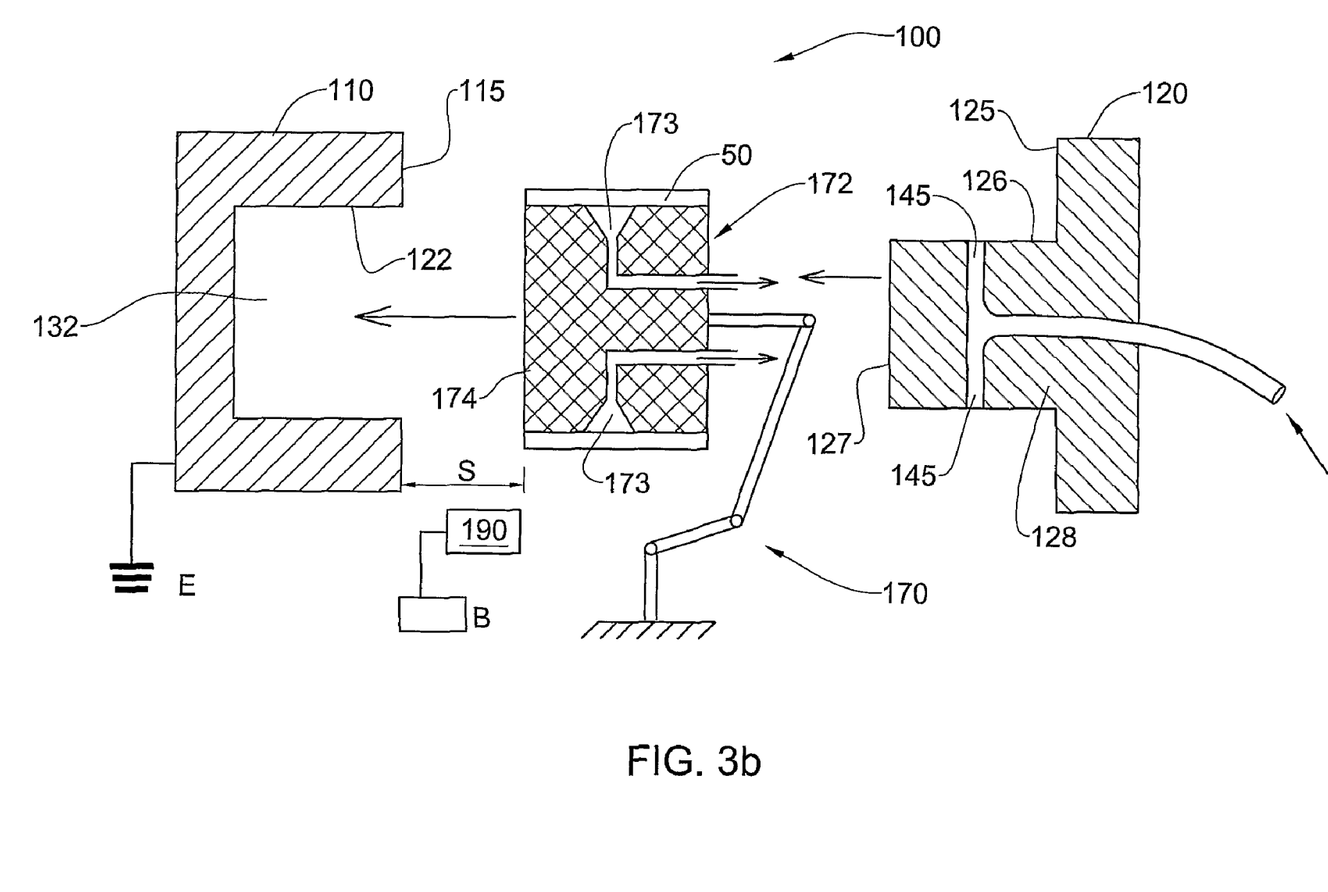

Next, the robotic arm 170 transports and positions the dummy 174 generally coaxially coaligned with the cavity 132 of the mold part 110, and spaced therefrom by spacing s. Charging applicator 190 is provided for applying an electrostatic charge to the outer-facing layer 51. Charging applicator 190 may be, for example, in the form of a charging bar comprising a plurality of emitter pins or alternatively may be in the form of a individual emitter modules; the style and number of applicators generally depends on the size and shape of the substrate 50, and the contours of the mold surface on which the substrate 50 is to be placed. An electrically grounded reference surface, such as a grounded metal plate, is provided in dummy 174, and may comprise the cylindrical surface of the dummy. Optionally, a layer of antistatic foam material may be bonded to the cylindrical ground metal surface of the dummy 174.

Charging applicator 190 is operatively connected to a high voltage DC electrical power supply, for example having a 30 kV adjustable output capacity, though in some embodiments, the charge required may be 15 to 20 kV, for example, and positioned in the path of the dummy 174 such that as this is transported and aligned with respect to the cavity 132, an electrostatic charge is induced on the outer layer 51. The ground reference surface, generally facing the inner surface 53, attracts the electric field from the charging applicator 190 and the outer layer 51 of the substrate 50 becomes charged. For example the applicator 190 may be positioned within spacing s or at any other suitable location. Alternatively, the applicator may be integrated with the end-of-arm tool 172.

The outer layer 51 of the substrate 50 is thus charged externally with respect to the mold or the dummy.

The charged substrate 50 is inserted into cavity 132 by the robotic arm 170 such that the outer layer 51 is axially aligned with the surface 122. The suction at suction ports 173 is terminated and the substrate 50 is then attracted to and held on surface 122 by virtue of its charge, the mold part 110, or at least a portion thereof defining the cavity 132 being electrically conducting and earthed at E. Optionally, air jets may be provided, for example at the dummy 174, to blow the substrate towards the cavity 132. The robotic arm 170 is then removed, and the mold parts 110 and 120 are mated, defining cavity 130 in which the substrate is appropriately aligned.

Figure 3C:
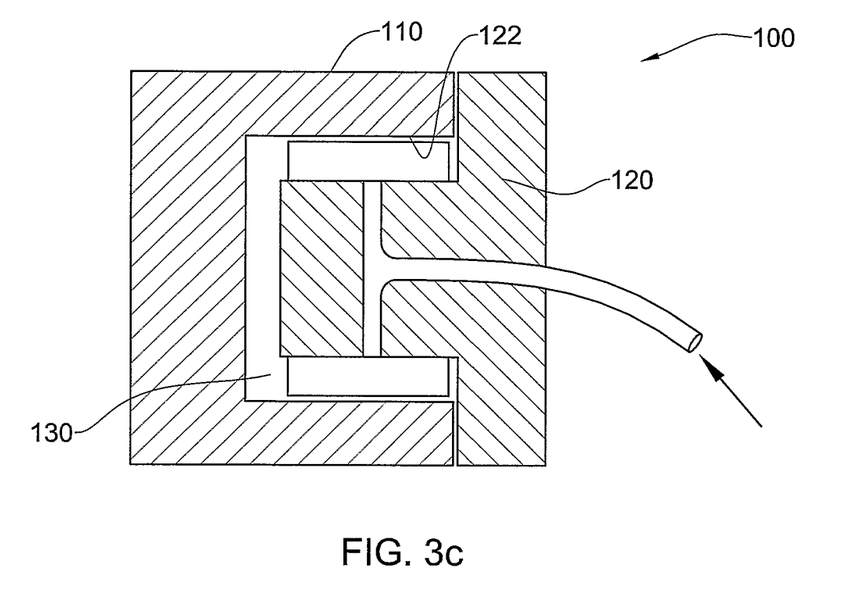
Figure 3D:
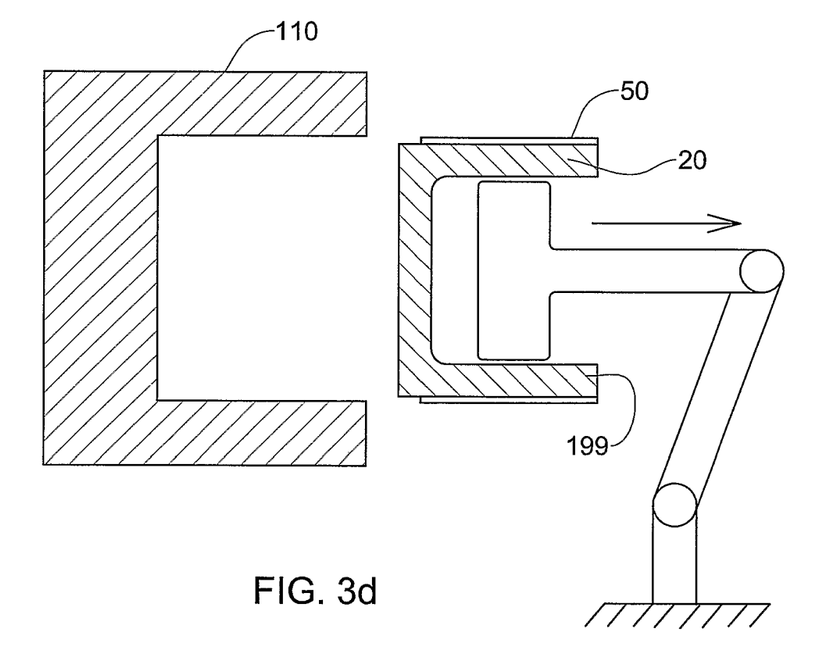

Referring in particular to FIG. 3c, the injection process is then initiated, molten material, typically a plastic material, in injected into cavity 130, via suitable injections stations 145 located on mold part 120 and/or in mold part 110 (not shown), the injection stations being located such as to inject molten material towards the inner layer 53 of the substrate 50, while generally avoiding injecting molten material directly to the outer layer 51, particularly where this corresponds to the exposed surface 21. The molten material possesses the inner layer 53, and further the injection process also serves to push the substrate 50 into substantially full abutment with surface 122, if this was not already the case. Once the injection material 199 has solidified, the substrate 50 is effectively integrally set with respect to the material 199, to form intermediate workpiece 20', which may then be removed from the mold part 110 or from mold part 120, having previously separated the mold parts 110 and 120. The same or a different robotic arm or positioning mechanism may be used for removing the workpiece 20' from the mold 100, via a suitable end-of-arm tool configured for so doing.

Optionally, a static neutralising bar 195 (FIG. 3a) may be provided in the robotic arm path between the charging applicator 190 and the magazine 160, so that whenever a new substrate 50 is being picked up the dummy 174, and in particular the suction cups 173, may be electrically neutralized, which helps to avoid electrostatic buildup at the suction cups 173.

While the process above has been described with respect to forming a cylindrical surface 21 on part 20, it may be applied, mutatis mutandis, to forming any other suitably-shaped surface, for example conical, frusto-conical, box-like, pyramidal, and so on, the substrate 50 being shaped appropriately so as to form the desired three-dimensional form when possessed by the material 199 in the mold. Similarly, in such cases the dummy 174 and the molding surface of mold 100 may also be shaped appropriately, for example, also conical, frusto-conical, box-like, pyramidal, and so on, respectively, particularly when the part is being designed having walls of generally uniform thickness.

Suitable control means may be provided for automating the manufacturing process, and suitable surface resistivity meters may be incorporated in the manufacturing system to check that sufficient charge is being applied to the substrate before the mold injection.

In a variation of the molding process, a substrate may be provided comprising a metallic layer and an outer facing non-conducting layer bonded thereto, similar to substrate 50, mutatis mutandis, but without an inner non-conducting layer. In such a case, the molten material comes into contact directly with the metallic layer, which may optionally be pre-treated as desired, for example having a coating of primer, adhesive, paint, etc., possessing the same during the injection process. In a variation of this process, where the metallic layer may be in the form of a net or mesh, or otherwise comprises openings exposing parts of the outer facing non-conducting layer to the molten material, these parts may be possessed by the molten material during the injection process.

The base 23, which may be fabricated separately, for example also via injection molding, may be mounted onto workpiece 20' to complete part 20. In other embodiments, the intermediate workpiece is the final part.

Figure 4:
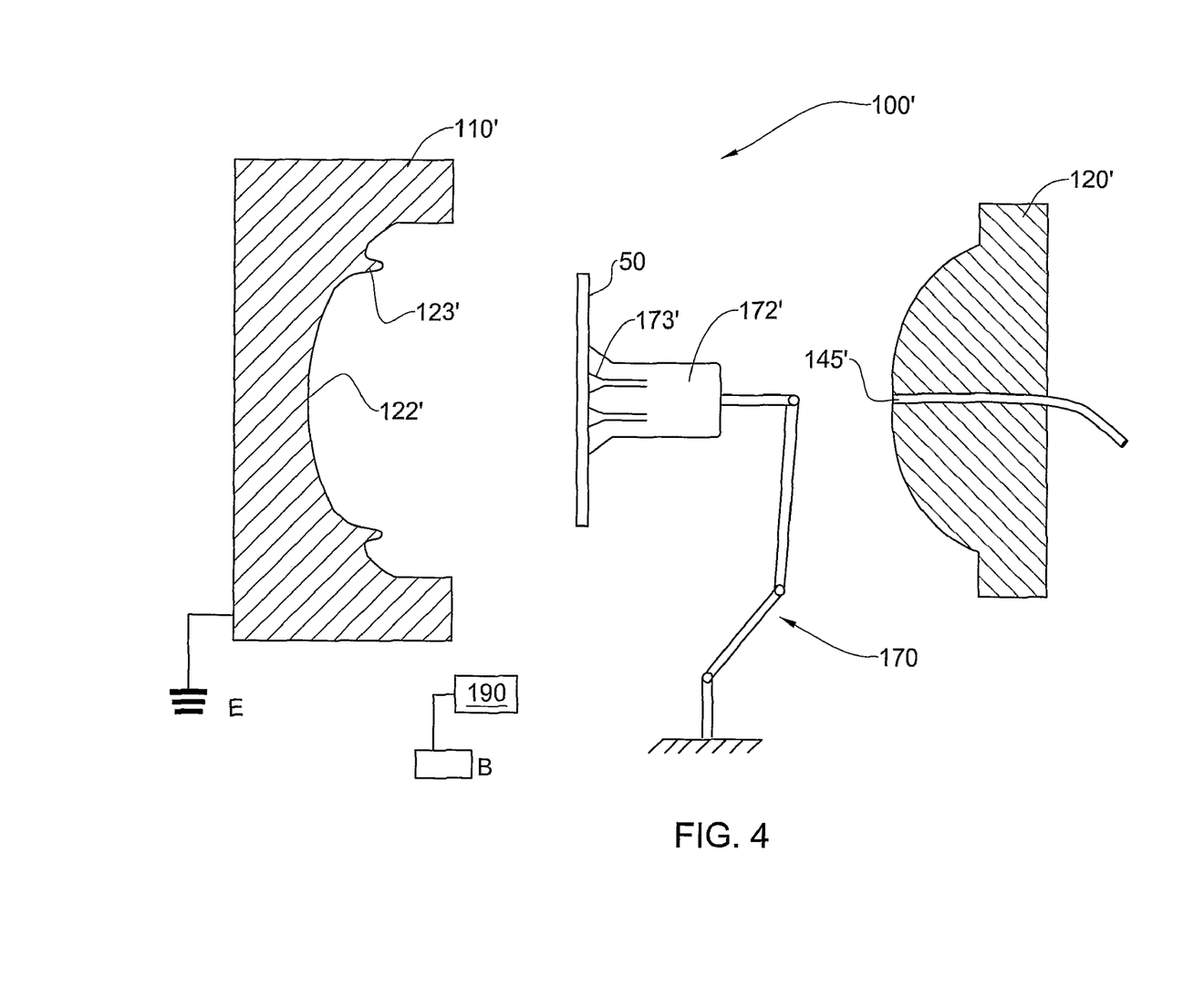
FIG. 4 illustrates a step in the manufacture of another part of the embodiment of FIG. 1

Referring to FIG. 4, the process for manufacturing part 30 is similar to that described for part 20, mutatis mutandis, with the following main differences. The substrate 50 is now disc-shaped, and the robotic arm 170 comprises an end-of-arm tool in the form of a suction head 174' comprising suction ports 173' and adapted for transporting and positioning the substrate in substantially flat form, rather than in a looped cylindrical form, into cavity 132' of female mold part 110', having been charged with static electricity via charger 190. The earthed mold part 110' holds at least a part of the substrate in abutting contact with mold surface 122', which corresponds to surface 31 of the part 30, the substrate 50 having been released from the robotic arm. Subsequently, the mold 100' is closed and material 199 is injected into the mold cavity via one or more outlets 145', pushing the substrate 50 into the cavity 132' such that the outer surface 51 is in substantially full abutting contact with surface 132'. In particular the central portion of the substrate 50 may be deformed to a mild convex form, and the circular edge 57 of the substrate 50 may be deformed to press against the generally cylindrical edge 123' of surface 122', to conform to such a particular form illustrated for the mold surface in FIG. 4.

According to another aspect of the invention, one or more free edges of the substrate 50 are visually hidden to some extent, and the manufactured item, for example corresponding parts 20, 30 are configured for this. This feature may help in effectively hiding from view possible misalignments between the substrate 50 and the desired or nominal position that it is intended to assume with respect to the particular corresponding molded part.

Figure 5:
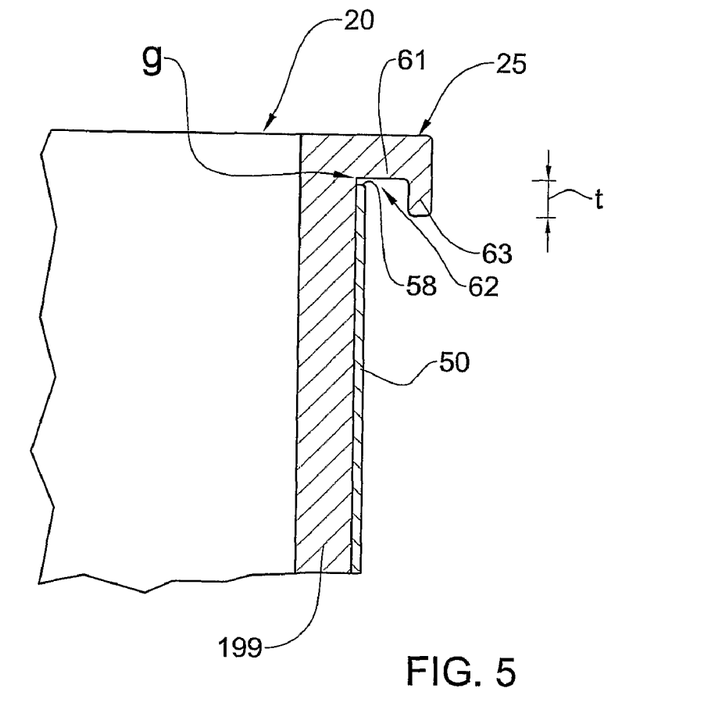
FIG. 5 illustrates, in partial cross-sectional view, a feature of part of the embodiment of FIG. 1, according to another aspect of the invention.

For example, referring to FIG. 5, the rim 25 of part 20 comprises a radially extending annular flange 61 having a circumferential lip 63 depending therefrom in the axial direction towards the base 23, defining an annular recess 62 between surface 21 and the lip 63 of depth t. Depth t is dimensionally greater, axially, than the gap g that is expected to be formed between edge 59 and the flange 61, including statistically acceptable variations in dimension g. Similarly, any overshoot of edge 58 into the recess and onto the underside of flange 61 will also not be readily apparent when viewing surface 21. Thus, when viewing part 20, edge 58 is effectively hidden from view via lip 63. By means of non-limiting example, depth t may be between about 0.3 to 13 mm, more particularly between about 1 mm and about 5 mm, and more particularly between about 2 mm and about 4 mm.

Figure 6:
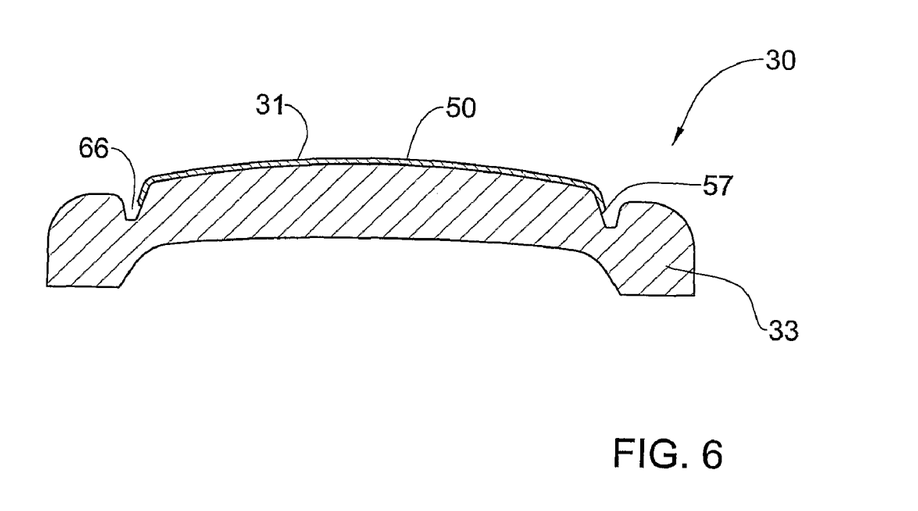
FIG. 6 illustrates, in partial cross-sectional view, a feature of another part of the embodiment of FIG. 1, according to an aspect of the invention.

In another example, and referring to FIG. 6, an annular recess 66 is provided between the surface 31 and the rim 33 of the lid 30. The recess 66 is of a depth such that allows the edge 57 or disc-shaped substrate 50 to be deformed into the recess to a variable depth during the injection molding process, even allowing parts of the edge 57 to overshoot the bottom of the recess 66. The edge 57 is effectively hidden from view, or at least not generally readily discernible, when viewing surface 31 from any one of a variety of directions, being effectively hidden by the rim 33. By means of non-limiting example, the depth of annular recess 66 may be between about 0.3 mm and about 5 mm, and more particularly between about 0.5 mm or about 1 mm and about 4 mm.

Figure 7:
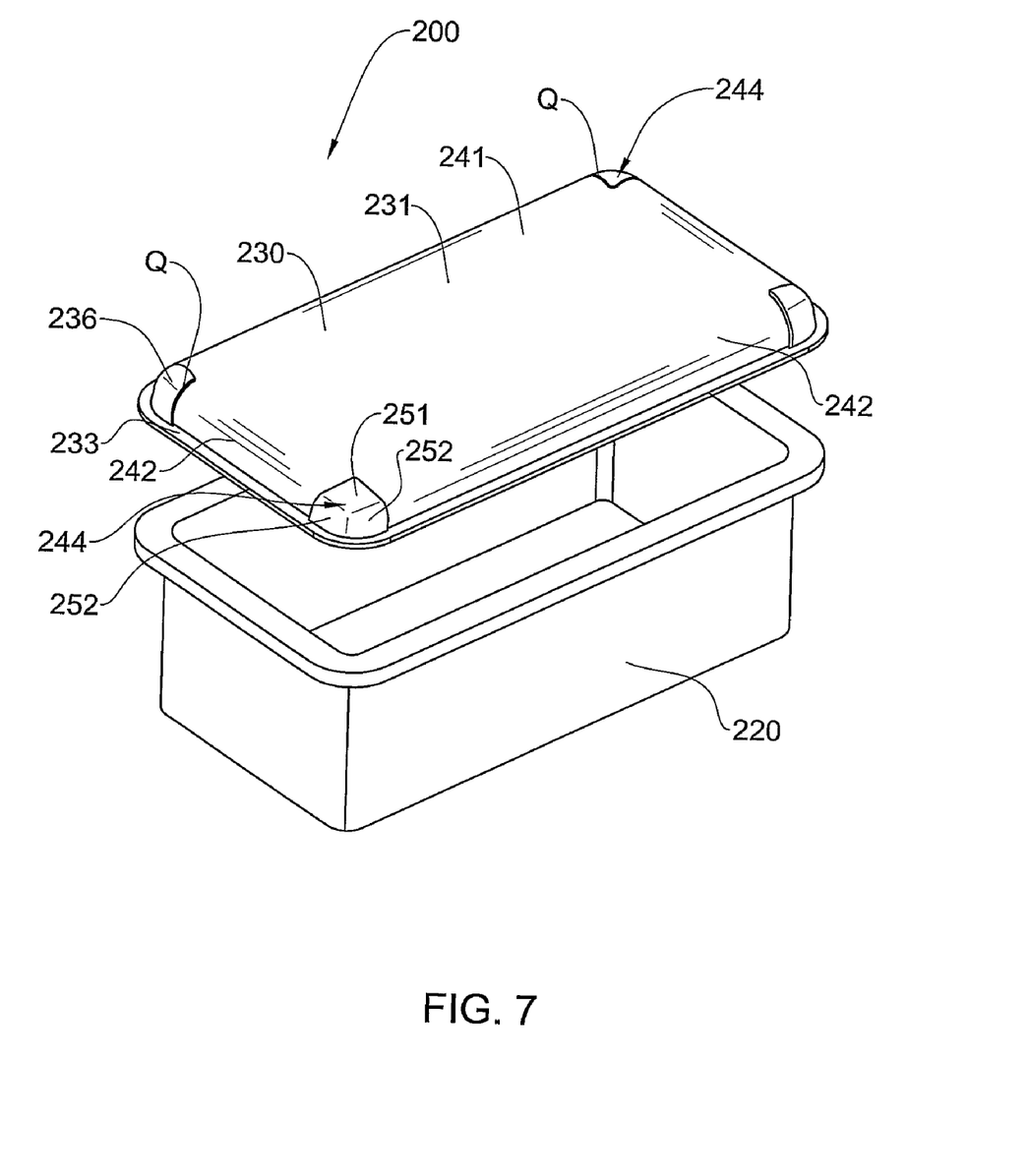
FIG. 7 illustrates, in partial cross-sectional view, another embodiment of an article manufactured according to the invention.

In yet another example, and referring to FIG. 7, the visual effect of a small mismatch in alignment between the substrate and manufactured part may also be effectively minimized by providing a stepped configuration at some of the visually exposed edges of the substrate with respect to the part. In this figure, a container 200 according to another embodiment of the invention is illustrated, comprising a box-like bottom part 220 and a lid part 230. The lid part 230 comprises a generally flat top 241 and sides 242 depending therefrom, with a rim 233 circumscribing the free edges of the sides 242. Corner portions 244 each comprise generally mutually orthogonal corner sides 252 and a corner top 251, which are protruding outwardly with respect to the corresponding sides 242 and top 241, respectively, by a step Q. By means of non-limiting example, the step Q may be between about 0.2 mm and about 5 mm, typically more particularly between about 0.3 mm or 0.5 mm an about 1 mm or 2 mm or 3 mm.

The visually exposed surface 231 of interest in this example is the top 241 and sides 242, but not including the corner portions 244 or rim 233. Accordingly, a substrate may be possessed in situ within a mold during the molding process for the lid part 230, for example in a similar manner to that described above for other embodiments of the invention mutatis mutandis. In this case, though, the substrate may be of a generally cruciform planform. Small misalignments between the concave corners of the cruciform substrate and the edges of corner portions 244 may result in some of the edges of the substrate overrunning onto steps Q or not reaching steps Q, and the presence of the step Q itself can aid to mask this misalignment. A similar effect may be obtained between the other edges of the substrate and the rim 233, and thus a recess (not shown) may be provided in rim 233 where the sides 242 and/or 252 meet the rim 233 for obscuring any misalignments between the corresponding edges of the substrate and the rim 233. The rim recess may be provided in addition to, or instead of, the stepped corner portions 244.

This aspect of the invention may be applied to substrates having a metallic appearance and comprising an electrically conducting material therein, for example substrate 50, or alternatively with fully non-conducting substrates, including printed artwork, patterns etc., mutatis mutandis, and using the method of injection molding according to the invention, or any other suitable injection molding method in which a substrate is placed in the mold before injection molding, mutatis mutandis.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

The invention claimed is:

1. A method of manufacture, comprising:
   (I) providing a substrate, comprising at least one electrically conducting layer overlaid with at least one dielectric outer-facing layer, and further comprising an inner-facing surface;
   (II) providing a ground reference surface facing said inner-facing surface and in contact therewith, the ground reference surface being electrically grounded, and, while said substrate and said ground reference surface are outside of a mold cavity, establishing a suitable electric field between an electric charger and said ground reference surface to electrostatically charge said outer-facing layer of said substrate;
   (III) transferring said substrate into said mold cavity and electrostatically holding said substrate in a desired position within said mold cavity; and
   (IV) injecting a suitable molten material into said mold cavity in a manner such that at least a layer of said molten material possesses said substrate via said inner-facing surface.

2. A method according to claim 1, wherein said substrate further comprises a dielectric inner-facing layer defining said inner-facing surface.

3. A method according to claim 1, wherein said electrically conducting layer comprises a metallic material.

4. A method according to claim 1, wherein said electrically conducting layer comprises a metallic foil.

5. A method according to claim 1, wherein said electrically conducting layer comprises at least one opening therethrough.

6. A method according to claim 1, wherein said electrically conducting layer is substantially continuous.

7. A method according to claim 1, wherein said electrically conducting layer comprises a metal or an alloy including at least one of: aluminum, silver, oxidized silver, gold, titanium, copper, tin, steel, stainless steel, galvanized steel, nickel, and magnesium.

8. A method according to claim 1, further comprising manufacturing molded items having at least one visually exposed surface, wherein said mold cavity comprises a molding surface generally complementary to said visually exposed surface, and wherein in step (III), said substrate is held in said desired position within said mold such that said outer-facing layer is in at least partial abutment with said molding surface.

9. A method according to claim 1, wherein said electrically conducting layer comprises a thickness of between about 5 micron and about 15 micron, or a thickness of between about 15 micron and about 30 micron, or a thickness of between about 30 micron and about 400 micron.

10. A method according to claim 1, wherein step (IV) comprises allowing the molten material to solidify and possess said substrate.

11. A method according to claim 1, wherein said electrically conducting layer comprises a thickness greater than about 30 micron.

12. A method according to claim 1, wherein step (II) comprises holding the substrate in a configuration generally corresponding to the form to be adopted by the substrate in step (IV).

13. A method according to claim 12, wherein said substrate is configured in the form of a loop.

14. A method according to claim 1, wherein in step (IV), the molten material is injected into the mold causing the substrate to conform to the mold surface by virtue of the molten material, when filling the mold cavity, exerting a force on the substrate forcing the substrate to abut intimately against the mold surface.

15. A method according to claim 1, wherein said mold is configured for forming a geometric feature in an item molded therein, said feature being associated with an edge of said substrate and adapted for at least partially obscuring said edge.

16. A method according to claim 15, wherein said geometric feature comprises a recess in the molded item, wherein said substrate edge is located at least partially projecting into said recess.

17. A method according to claim 15, wherein said geometric feature comprises a raised step formed on a visually exposed surface of said molded item, wherein said substrate edge is located in close proximity to said step.

* * * * *